United States Patent
Yang et al.

(10) Patent No.: US 12,429,088 B1
(45) Date of Patent: Sep. 30, 2025

(54) THERMALLY STABLE POLYCRYSTALLINE DIAMOND (TSP) BEARINGS FOR ROTARY STEERABLE TOOLS AND METHODS FOR MANUFACTURING TSP BEARINGS

(71) Applicant: SICHUAN XIONGCHEN TECHNOLOGY CO., LTD, Sichuan (CN)

(72) Inventors: Anjun Yang, Deyang (CN); Yuanqiong He, Deyang (CN)

(73) Assignee: SICHUAN XIONGCHEN TECHNOLOGY CO., LTD, Deyang (CN)

( * ) Notice: Subject to any disclaimer, the term of this patent is extended or adjusted under 35 U.S.C. 154(b) by 0 days.

(21) Appl. No.: 19/263,478

(22) Filed: Jul. 8, 2025

(30) Foreign Application Priority Data

Mar. 7, 2025 (CN) .......................... 202510267829.6

(51) Int. Cl.
  *F16C 19/30* (2006.01)
  *F16C 19/36* (2006.01)
  (Continued)

(52) U.S. Cl.
  CPC ............ *F16C 19/364* (2013.01); *F16C 19/30* (2013.01); *F16C 19/52* (2013.01); *F16C 25/08* (2013.01);
  (Continued)

(58) Field of Classification Search
  CPC ........ F16C 19/30; F16C 19/364; F16C 19/52; F16C 25/08; F16C 33/366; F16C 33/4641;
  (Continued)

(56) References Cited

U.S. PATENT DOCUMENTS

| | | | |
|---|---|---|---|
| 2015/0292553 A1* | 10/2015 | Ai | F16C 19/305 |
| | | | 384/450 |
| 2017/0241208 A1* | 8/2017 | Bomidi | F16C 33/366 |
| 2017/0350446 A1* | 12/2017 | Otto | E21B 44/00 |

FOREIGN PATENT DOCUMENTS

| | | |
|---|---|---|
| CN | 2718313 Y | 8/2005 |
| CN | 207229589 U | 4/2018 |

(Continued)

OTHER PUBLICATIONS

First Office Action in Chinese Application No. 202510267829.6 mailed on Apr. 16, 2025, 17 pages.

(Continued)

*Primary Examiner* — Phillip A Johnson
(74) *Attorney, Agent, or Firm* — PORUS IP LLC

(57) ABSTRACT

A TSP bearing for a rotary steerable tool and a method for manufacturing the TSP bearing, relating to a bearing field. The TSP bearing includes a seat ring, a shaft ring, a blocking unit, a positioning unit, a multifunctional unit, and a detection unit. The shaft ring is provided directly above the seat ring and a circular array of tapered rollers is provided between the seat ring and the shaft ring. The blocking unit is provided inside the seat ring. The positioning unit is provided outside the circular array of tapered rollers. The multifunctional unit is provided in the positioning unit. The detection unit is provided in the positioning unit. The detection unit is configured to detect a wear situation of the seat ring, the shaft ring, and the circular array of tapered rollers.

9 Claims, 12 Drawing Sheets

(51) Int. Cl.
   *F16C 19/52*   (2006.01)
   *F16C 25/08*   (2006.01)
(52) U.S. Cl.
   CPC ...... *F16C 2206/04* (2013.01); *F16C 2233/00* (2013.01); *F16C 2352/00* (2013.01)
(58) Field of Classification Search
   CPC .............. F16C 33/4647; F16C 33/4652; F16C 2206/04; F16C 2233/00; F16C 2352/00
   See application file for complete search history.

(56) References Cited

FOREIGN PATENT DOCUMENTS

| | | |
|---|---|---|
| CN | 112412970 A | 2/2021 |
| DE | 102011007635 A1 | 10/2012 |
| DE | 102014223754 A1 | 5/2016 |
| JP | 2006329331 A | 12/2006 |
| JP | 2014066310 A | 4/2014 |
| WO | 2022077733 A1 | 4/2022 |

OTHER PUBLICATIONS

Notification to Grant Patent Right for Invention in Chinese Application No. 202510267829.6 mailed on May 15, 2025, 4 pages.
Li, Gang, Concept for Developing a Fault Detection System for Rolling Bearings in Freight Cars, 2004, 4 pages.

* cited by examiner

THERMALLY STABLE POLYCRYSTALLINE DIAMOND (TSP) BEARINGS FOR ROTARY STEERABLE TOOLS AND METHODS FOR MANUFACTURING TSP BEARINGS

CROSS-REFERENCE TO RELATED APPLICATIONS

This application claims priority to Chinese Application No. 202510267829.6, filed on Mar. 7, 2025, the entire contents of which are hereby incorporated by reference.

TECHNICAL FIELD

The present disclosure relates to a bearing field, and in particular, to TSP bearings for rotary steerable tools and methods for manufacturing the TSP bearings.

BACKGROUND

The rotary steerable tool is an instrument used in drilling engineering, primarily designed to enable steering control while allowing continuous rotation of the drill string during directional drilling. The rotary steerable tool needs to be fitted with a thermally stable polycrystalline diamond (TSP) bearing, which reduces friction, ensures a stable operation, and improves guidance accuracy.

Currently, the TSP bearing in use lacks a temporary storage function for impurities and wear debris of the parts that enter during operation, resulting in impurities and wear debris affecting the subsequent service life of the TSP bearing. The conventional TSP bearing cage is generally connected by screws, which is non-conducive to rapid replacement of tapered rollers, and complicates stacking a plurality of bearings for transportation, necessitating individual packaging, which reduces logistical efficiency. Additionally, during maintenance, it is inconvenient to observe the wear situation of the seat ring, the shaft ring, and tapered rollers, leading to delays in replacing the worn parts, affecting the subsequent operational performance.

In view of the above, it is desired to provide a TSP bearing for a rotary steerable tool and a method for manufacturing the TSP bearing to solve the above problem.

SUMMARY

One aspect of the present disclosure provides a TSP bearing for a rotary steerable tool, including a seat ring, a shaft ring, a blocking unit, a positioning unit, a multifunctional unit, and an inspection unit. The shaft ring may be provided directly above the seat ring, and a circular array of tapered rollers is provided between the seat ring and the shaft ring. The blocking unit may be provided inside the seat ring and the blocking unit may be configured to seal collected impurities. The positioning unit may be provided outside the circular array of tapered rollers, and the positioning unit may be configured to position the circular array of tapered rollers. The multifunctional unit may be provided on the positioning unit for limiting the positioning unit, the multifunctional unit may also be configured to connect the seat ring with the shaft ring. The detection unit may be provided on the positioning unit, and the detection unit may be configured to detect wear conditions of the seat ring, the shaft ring, and the circular array of tapered rollers.

The seat ring may be provided with an impurity temporary storage groove. An inner wall of the seat ring is provided with a circular array of first connecting clamping grooves, and a size of the circular array of first connecting clamping grooves is the same as a size of the circular array of second connecting clamping grooves.

In some embodiments, the blocking unit may include a circular blocking ring and a circular array of second return spring. The circular blocking ring may be provided in the impurity temporary storage groove, with a gap existing between the circular blocking ring and the seat ring. The circular array of the second return springs may be fixedly provided at a bottom of the circular blocking ring.

In some embodiments, the positioning unit may include a positioning cage, a limiting snap ring, and a circular array of circular pressing rod. The positioning cage may be rotationally connected to the circular array of tapered rollers. The limiting snap ring may be slidingly provided on an outer side of the positioning cage. The circular array of circular pressing rods may be fixedly provided on a bottom of the positioning cage, and a bottom of the circular array of circular pressing rods may be in contact with the circular blocking ring.

In some embodiments, the positioning cage may be provided with two receiving slots, and the limiting snap ring may be provided with a circular array of positioning round holes.

In some embodiments, the multifunctional unit may include a circular movable shaft and an arc-shaped connecting plate. The circular movable shaft may be slidably provided on the positioning cage, an outer end of the circular movable shaft may be provided with a chamfer, and the outer end of the circular movable shaft may be inserted into a corresponding positioning round hole. The arc-shaped connecting plate may be fixedly provided on an inner end of the circular movable shaft, two rectangular gripping slots may be provided on the arc-shaped connecting plate, and the outer side of the arc-shaped connecting plate is in contact with the positioning cage.

In some embodiments, the multifunctional unit may further include two circular inserts, a first force-bearing ring, and a first return spring. The two circular inserts may be fixedly provided on an outer side of the arc-shaped connecting plate. The two circular inserts may be received in the two receiving slots, outer ends of the two circular inserts may be provided with chamfers, and the two circular inserts may be inserted into one of the first connecting clamping grooves and one of the second connecting clamping grooves, respectively. The first force-bearing ring may be fixedly provided on an outer side of the circular movable shaft. The first return spring may be sleeved over the circular movable shaft and the first return spring may be located on an inner side of the first force-bearing ring.

In some embodiments, the detection unit may include a circular mounting sleeve, a circular connecting shaft, and two circular mounting seats. The circular mounting sleeve may be fixedly provided on the positioning cage. The circular connecting shaft may be rotatably provided inside the circular mounting sleeve, and an outer wall of the circular connecting shaft may be provided with a circular array of arc-shaped grooves. The two circular mounting seats may be fixedly provided at two ends of the circular connecting shaft.

In some embodiments, the detection unit may further include two circular arrays of rectangular metal blocks, a circular positioning rod, a second force-bearing ring, and a return tension spring. The two circular arrays of rectangular metal blocks may be fixedly provided on the two circular mounting seats. There may be a gap between an upper circular array of rectangular metal blocks in the two circular arrays of rectangular metal blocks and the shaft ring, and there may be a gap between a lower circular array of rectangular metal blocks in the two circular arrays of rectangular metal blocks and the seat ring. The circular positioning rod may be slidably provided on the circular mounting sleeve, with an inner end of the circular positioning rod provided with fillets, and the circular positioning rod may be inserted into corresponding arc-shaped grooves. The second force-bearing ring may be fixedly provided on an outer end of the circular positioning rod. The return tension spring may be sleeved over the circular positioning rod, with an outer end of the return tension spring fixedly connected with the second force-bearing ring and an inner end of the return tension spring fixedly connected with the circular mounting sleeve.

Another aspect of the present disclosure also provides a method for manufacturing a TSP bearing for a rotary steerable tool. The method may include inserting the circular array of tapered rollers into the positioning cage, pulling the arc-shaped connecting plate outward, slidingly providing the limiting snap ring on the outer side of the positioning cage, and then releasing the arc-shaped connecting plate to allow the outer end of the circular movable shaft to be inserted into the corresponding positioning hole; placing the circular array of tapered rollers on top of the seat ring, ensuring that the bottom of the circular array of circular pressing rods is in contact with the circular blocking ring; placing the shaft ring on top of the circular array of tapered rollers; and pulling the arc-shaped connecting plate outward to separate the two circular inserts from the two receiving slots, then rotating the arc-shaped connecting plate by 90 degrees, subsequently, releasing the arc-shaped connecting plate to ensure that the two circular inserts are inserted into one of the first connecting clamping grooves and one of the second connecting clamping grooves, respectively.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

Figure 1:
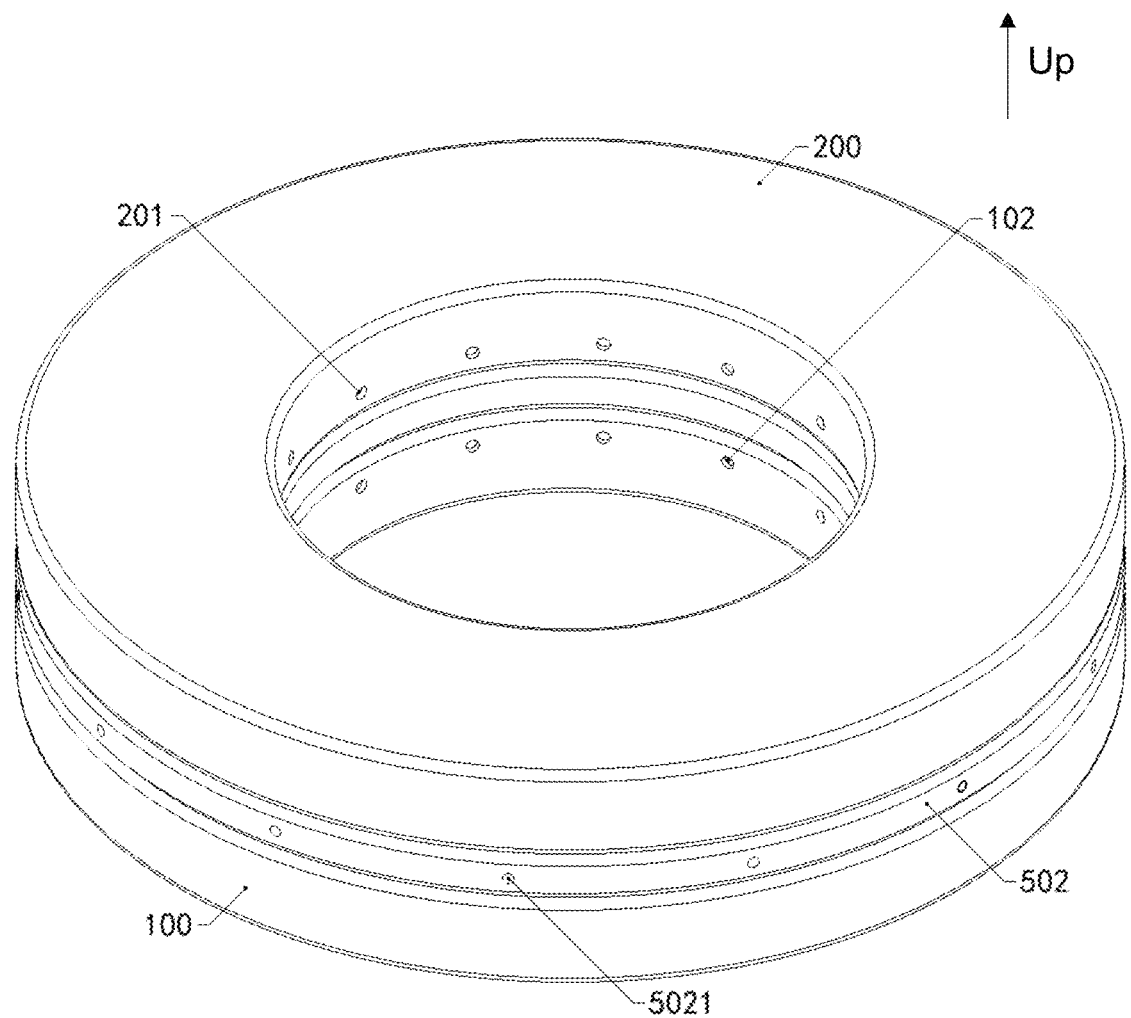
FIG. 1 is a schematic diagram illustrating a three-dimensional structure of a TSP bearing according to some embodiments of the present disclosure.

DESCRIPTION OF MARKERS IN THE ACCOMPANYING DRAWINGS 100, seat ring; 101, impurity temporary storage groove; 102, first connecting clamping groove; 103, inclined deflector groove; 1031, blocking member; 104, signal receiver; 105, control assembly; 200, shaft ring; 201, second connecting clamping groove; 300, tapered roller; 400, blocking unit; 401, circular blocking ring; 4011, piezoelectric sensor; 402, second return spring; 500, positioning unit; 501, positioning cage; 5011, receiving slot; 502, limiting snap ring; 5021, positioning hole; 503, circular pressing rod; 600, multifunctional unit; 601, circular movable shaft; 602, arc-shaped connecting plate; 6021, rectangular gripping slot; 603, circular insert; 604, first force-bearing ring; 605, first return spring; 700, detection unit; 701, circular mounting sleeve; 702, circular connecting shaft; 7021, arc-shaped groove; 703, circular mounting seat; 704, rectangular metal block; 705, circular positioning rod; 706, second force-bearing ring; 707, return tension spring.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation It will be understood that the terms "system," "unit," "module," and/or "block" used herein are to distinguish different components, elements, parts, sections, or assemblies of different levels in ascending order. However, the terms may be displaced by another expression if they achieve the same purpose.

The words "one", "a", "a kind" and/or "the" are not especially singular but may include the plural unless the context expressly suggests otherwise. In general, the terms "comprise", "comprises", "comprising", "include", "includes", and/or "including", merely prompt to include operations and elements that have been clearly identified, and these operations and elements do not constitute an exclusive listing. The methods or devices may also include other operations or elements.

FIG. 1 is a schematic diagram illustrating a three-dimensional structure of a TSP bearing according to some embodiments of the present disclosure.

Figure 9:
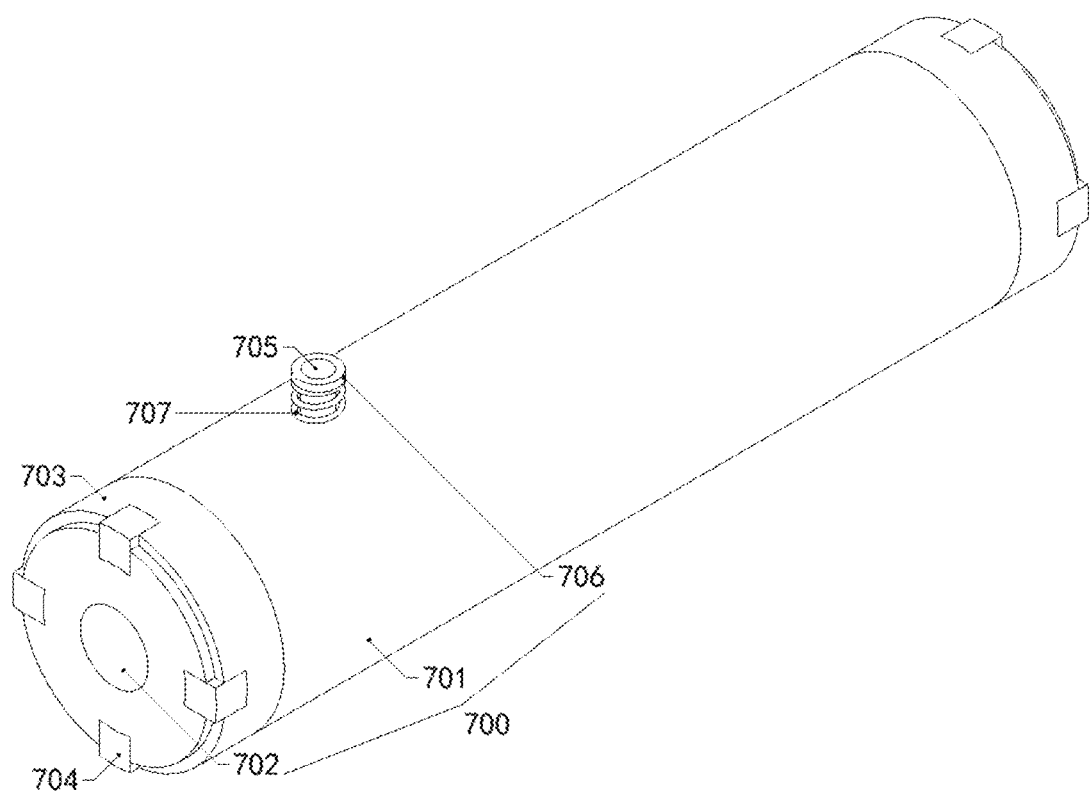
FIG. 9 is a schematic diagram illustrating a detection unit according to some embodiments of the present disclosure.

Referring to FIG. 1, the present disclosure provides a TSP bearing for a rotary steerable tool, including a seat ring 100, a shaft ring 200, a blocking unit 400 (refer to FIG. 4), a positioning unit 500 (refer to FIG. 2), a multifunctional unit 600 (refer to FIG. 5), and a detection unit 700 (refer to FIG. 9). The TSP bearing refers to a kind of crossed roller bearing with high rigidity and high precision. TSP is a diamond polymer made by sintering diamond and bonding agent under high temperature and high pressure.

The seat ring 100 refers to a structure located at a bottom of the TSP bearing for carrying the rest of the components. The shaft ring 200 refers to a bearing washer that is provided on a rotating shaft. In some embodiments, as shown in FIG. 1, the shaft ring 200 is provided directly above the seat ring 100, and a circular array of tapered rollers 300 is provided between the seat ring 100 and the shaft ring 200. The tapered rollers 300 refer to rolling elements in the shape of a conical table.

The blocking unit 400 refers to a unit that blocks impurity spillage. In some embodiments, the blocking unit 400 is provided inside the seat ring 100, and the blocking unit 400 is configured to seal the collected impurities.

The positioning unit 500 refers to a unit configured to position the tapered rollers 300. In some embodiments, the positioning unit 500 is provided outside the circular array of tapered roller 300, and the positioning unit 500 is configured to locate the circular array of tapered rollers 300.

The multifunctional unit 600 refers to a unit for limiting or connecting a portion of the assemblies of the TSP bearing. In some embodiments, the multifunctional unit 600 is provided on the positioning unit 500, the multifunctional unit 600 is configured to limit the positioning unit 500, and the multifunctional unit 600 is also configured to connect the seat ring 100 to the shaft ring 200.

The detection unit 700 refers to a unit configured to detect wear conditions. In some embodiments, the detection unit 700 is provided on the positioning unit 500, and the detection unit 700 is configured to detect wear conditions of the seat ring 100, the shaft ring 200, and the circular array of tapered rollers 300.

In some embodiments, the seat ring 100 is provided with an impurity temporary storage groove 101. The impurity temporary storage groove 101 refers to a groove configured to temporarily store impurities generated during operation.

In some embodiments, an inner wall of the seat ring 100 is provided with a circular array of first connecting clamping grooves 102. An inner wall of the shaft ring 200 is provided with a circular array of second connecting clamping grooves 201, and a size of the circular array of first connecting clamping grooves 102 are the same as a size of the circular array of second connecting clamping grooves 201. The first connecting clamping grooves 102 and the second connecting clamping grooves 201 refer to grooves configured to connect the seat ring 100 and the shaft ring 200 in conjunction with the multifunctional unit 600, as described in more detail hereinafter.

Figure 2:
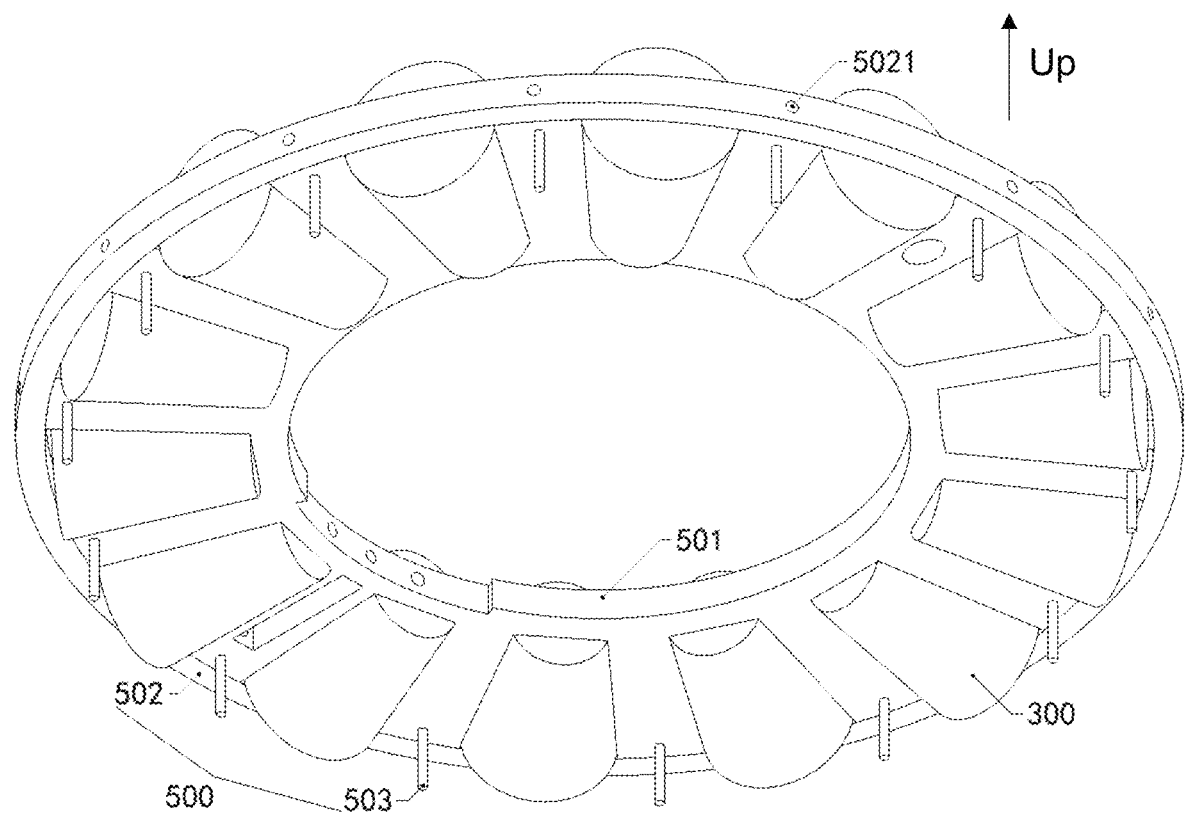
FIG. 2 is a schematic diagram illustrating a circular array of tapered rollers and a positioning unit according to some embodiments of the present disclosure.
Figure 3:
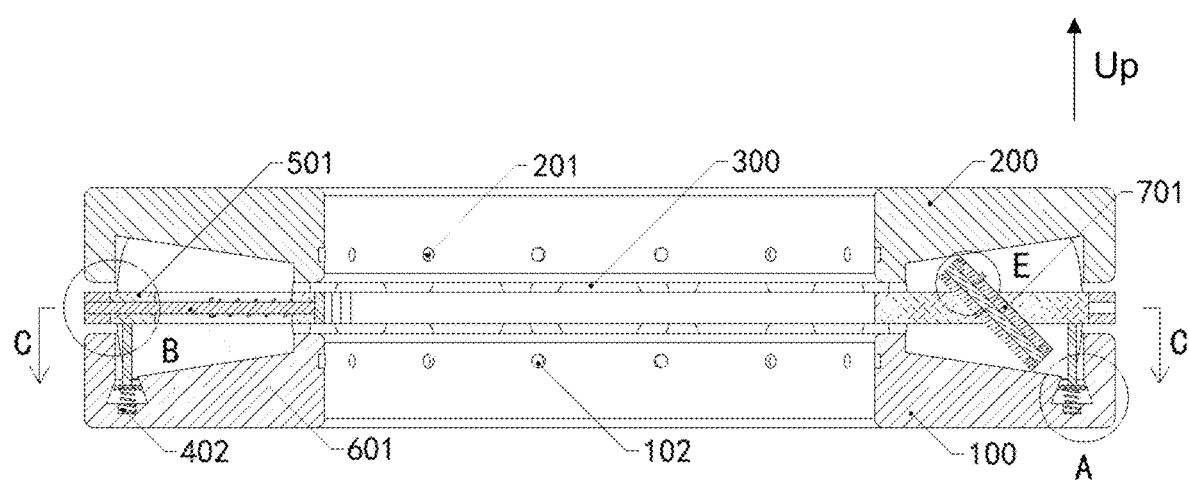
FIG. 3 is a schematic diagram illustrating a center-section structure of FIG. 1.
Figure 4:
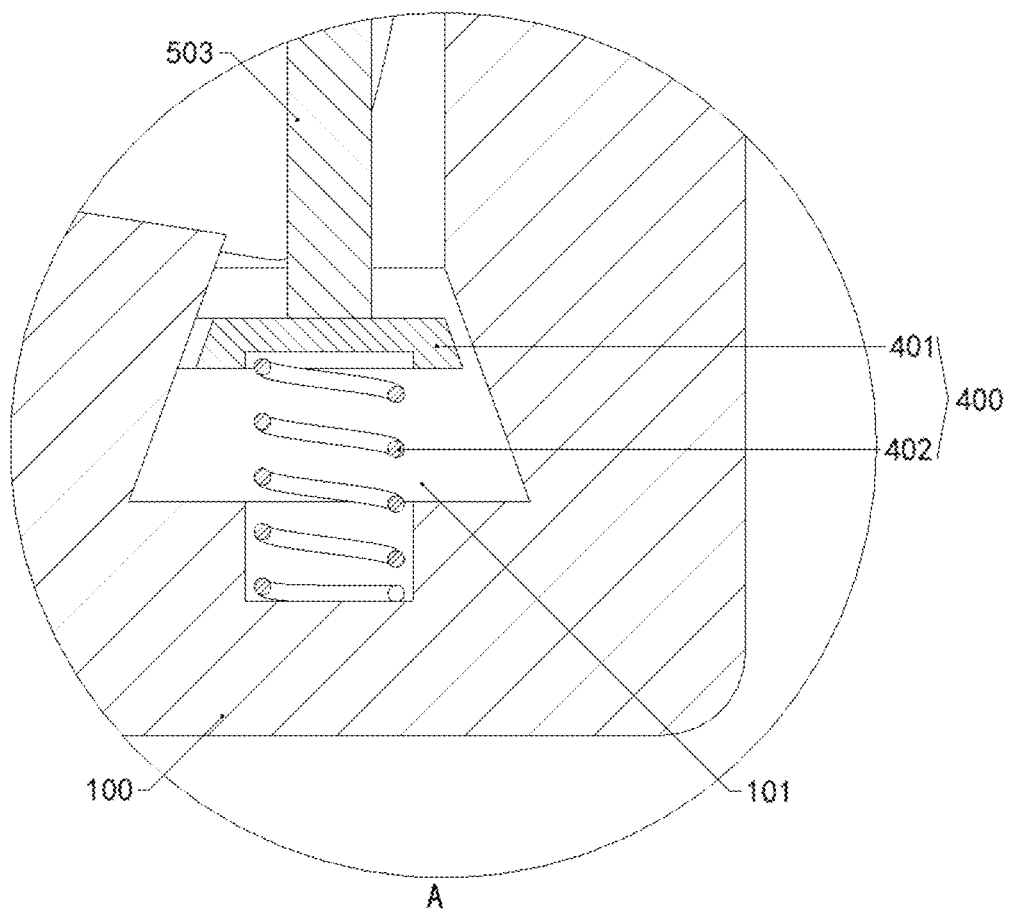
FIG. 4 is a partially enlarged diagram of a structure of region A in FIG. 3.

FIG. 2 is a schematic diagram illustrating a circular array of tapered rollers and a positioning unit according to some embodiments of the present disclosure. FIG. 3 is a schematic diagram illustrating a center-section structure of FIG. 1. FIG. 4 is a partially enlarged diagram of a structure of region A in FIG. 3.

In some embodiments of the present disclosure, as shown in FIG. 2 and FIG. 4, the blocking unit 400 includes a circular blocking ring 401 and a circular array of second return springs 402.

The circular blocking ring 401 refers to a ring-shaped part configured to block the impurity spillage. The second return springs 402 refer to springs configured to reset the position of the circular blocking ring 401 to change a sealing state. In some embodiments, the circular blocking ring 401 is provided in the impurity temporary storage groove 101, and there is a gap between the circular blocking ring 401 and the seat ring 100. The circular array of the second return springs 402 are fixedly provided at a bottom (i.e., a portion facing the impurity temporary storage groove 101) of the circular blocking ring 401.

In some embodiments, the positioning unit 500 includes a positioning cage 501, a limiting snap ring 502.

The positioning cage 501 refers to a cage configured to maintain the position of the circular array of tapered rollers 300. In some embodiments, the positioning cage 501 is rotationally connected to the circular array of tapered rollers 300. The limiting snap ring 502 refers to a ring configured to limit the position of the circular array of tapered rollers 300. In some embodiments, the limiting snap ring 502 is slidably provided on an outer side of the positioning cage 501.

In some embodiments, the positioning unit 500 further includes a circular array of circular pressing rods 503. The circular pressing rods 503 refer to rods configured to press the circular blocking ring 401 to close the impurity temporary storage groove 101. In some embodiments, the circular array of circular pressing rods 503 is fixedly provided on a bottom (i.e., the portion facing the seat ring 100) of the positioning cage 501, and a bottom of the circular array of circular pressing rods 503 (i.e., the portion facing the seat ring 100) is in contact with the circular blocking ring 401.

In some embodiments, two receiving slots 5011 are provided on the positioning cage 501. The receiving slots 5011 refer to slots configured to receive circular inserts 603. More descriptions regarding the circular inserts 603 may be found hereinafter.

In some embodiments, the limiting snap ring 502 is provided with a circular array of positioning holes 5021 for positioning. The positioning holes 5021 refer to round holes for positioning the limiting snap ring 502.

In some embodiments of the present disclosure, by providing the impurity temporary storage groove 101 on the seat ring 100, the impurities and the wear debris of the parts that enter during operation are temporarily stored, thus avoiding the impurities and the wear debris from affecting the subsequent service life. By fixedly providing the circular array of circular pressing rods 503 at the bottom of the positioning cage 501, making the bottom of the circular array of circular pressing rods 503 contact with the circular blocking ring 401, and fixedly providing the circular array of second return springs 402 at the bottom of the circular blocking ring 401, when the staff removes the positioning unit 500, the circular blocking ring 401 automatically moves upward under the action of the second return springs 402, so that the circular blocking ring 401 automatically contacts the seat ring 100. When the staff wipes the inside of the seat ring 100 in the maintenance process, the circular blocking ring 401 seals the impurity temporary storage groove 101, avoiding bringing out the impurities in the impurity temporary storage groove 101 during the wiping process, and facilitating wiping of the inside of the seat ring 100. When the seat ring 100 is finished wiping, the staff resets the positioning unit 500, and the circular array of circular pressing rods 503 drives the circular blocking ring 401 to move downward automatically.

Figure 5:
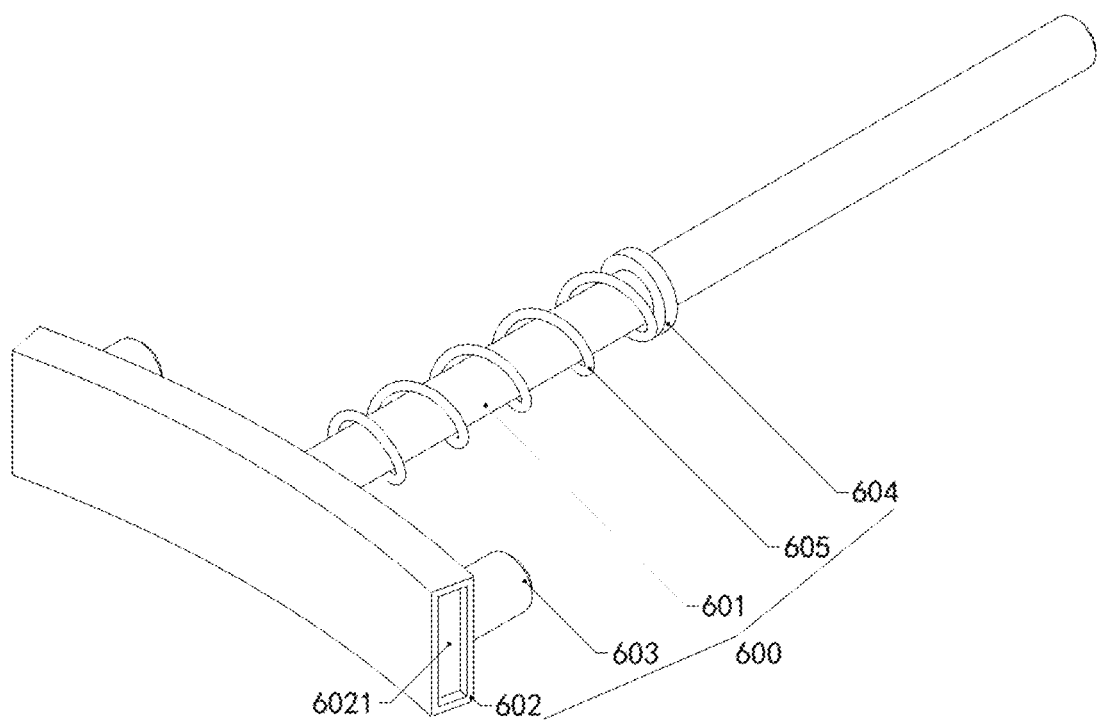
FIG. 5 is a schematic diagram illustrating a multifunctional unit according to some embodiments of the present disclosure.
Figure 6:
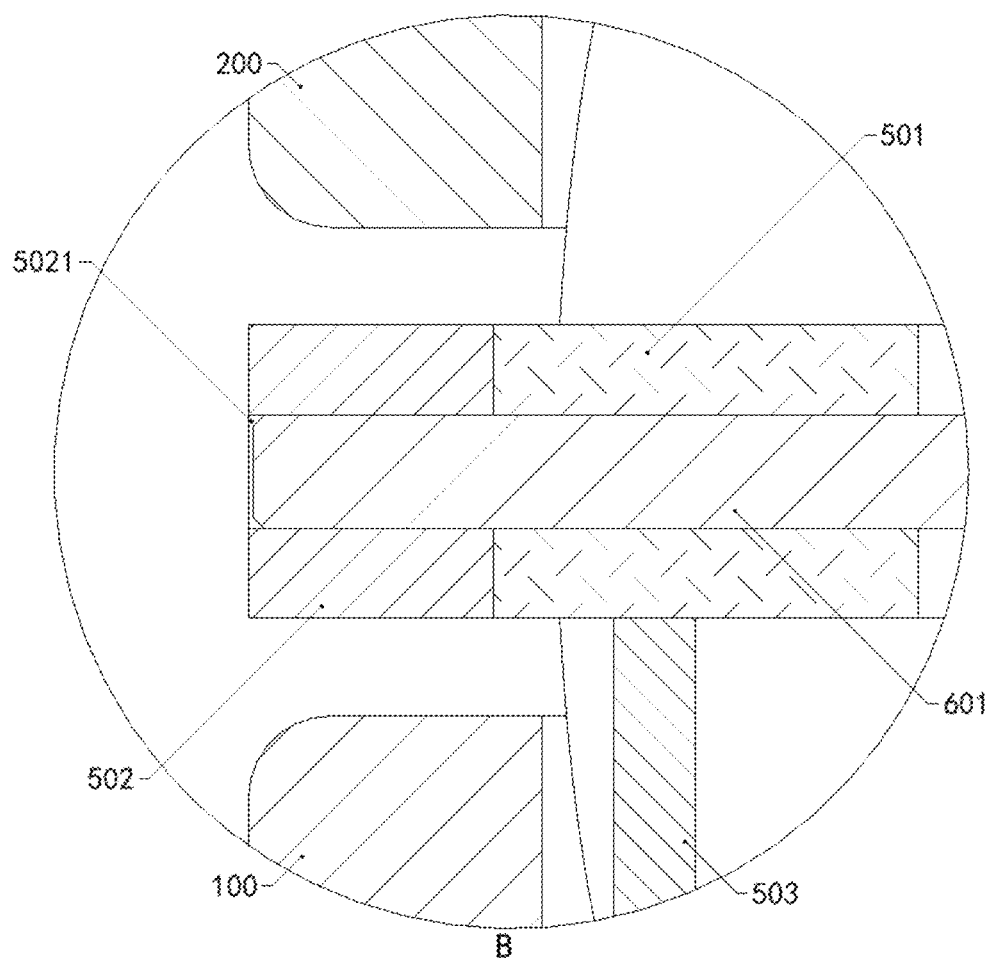
FIG. 6 is a partially enlarged diagram of a structure of region B in FIG. 3.
Figure 7:
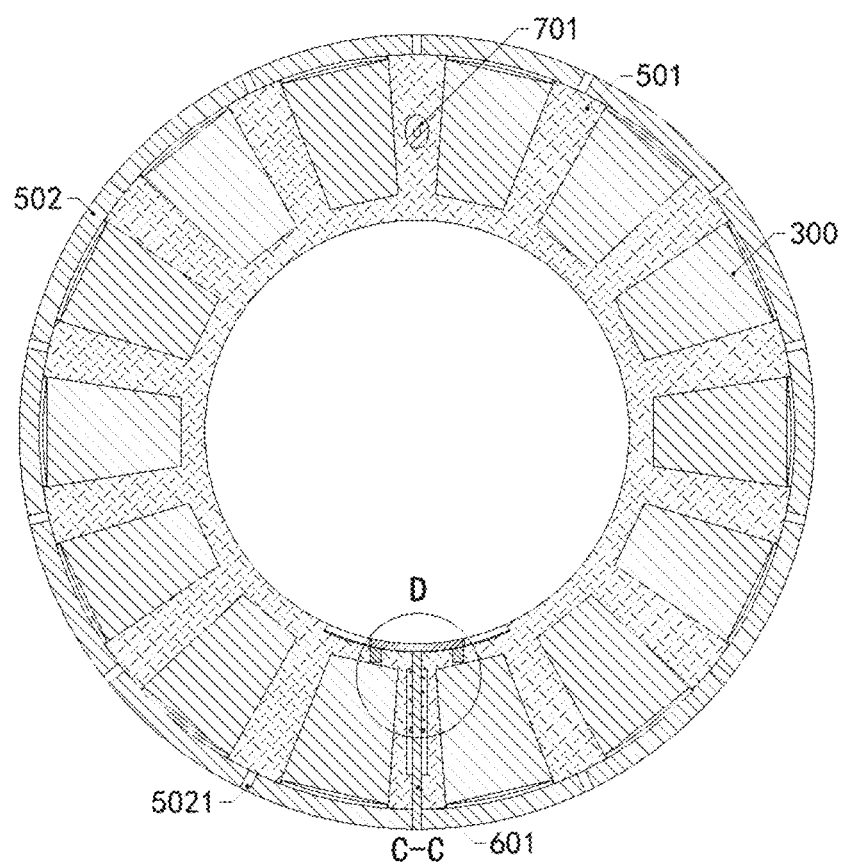
FIG. 7 is a schematic diagram illustrating a section structure in a C-C direction in FIG. 3.
Figure 8:
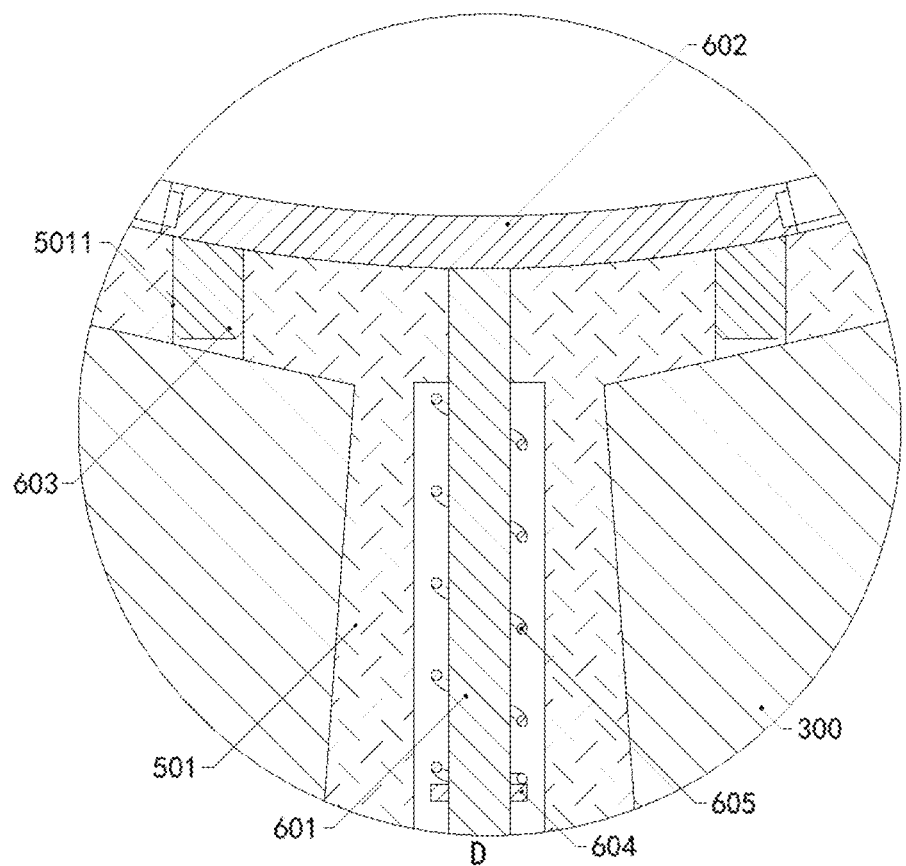
FIG. 8 is a partially enlarged diagram of a structure of region D in FIG. 7.

FIG. 5 is a schematic diagram illustrating a multifunctional unit according to some embodiments of the present disclosure. FIG. 6 is a partially enlarged diagram of a structure of region B in FIG. 3. FIG. 7 is a schematic diagram illustrating a section structure in a C-C direction in FIG. 3. FIG. 8 is a partially enlarged diagram of a structure of region D in FIG. 7.

In some embodiments of the present disclosure, as shown in FIG. 5, FIG. 6, and FIG. 8, the multifunctional unit 600 includes a circular movable shaft 601, an arc-shaped connecting plate 602, a circular insert block 603, a first force-bearing ring 604, and a first return spring 605.

The circular movable shaft 601 refers to a shaft that achieves fixation or separation of the positioning cage 501 from the limiting snap ring 502. In some embodiments, the circular movable shaft 601 is slidably provided on the positioning cage 501, an outer end of the circular movable shaft 601 is provided with a chamfer, and the outer end of the circular movable shaft 601 is inserted in a corresponding positioning hole 5021.

The arc-shaped connecting plate 602 refers to a connecting plate that connects the seat ring 100 and the shaft ring 200. In some embodiments, the arc-shaped connecting plate 602 is fixedly provided on an inner end of the circular movable shaft 601. In some embodiments, the arc-shaped connecting plate 602 is provided with two rectangular gripping slots 6021, and an outer side of the arc-shaped connecting plate 602 is in contact with the positioning cage 501.

The circular inserts 603 refer to inserts configured to fix the arc-shaped connecting plate 602. In some embodiments, two circular inserts 603 are provided, and the two circular inserts 603 are fixedly provided on the outer side of the arc-shaped connecting plate 602. The two circular inserts 603 are received in the two receiving slots 5011, and the two circular inserts 603 may be inserted into one of the first connecting clamping grooves 102 and one of the second connecting clamping grooves 201, respectively.

In some embodiments, outer ends of the two circular inserts 603 are provided with chamfers.

The first force-bearing ring 604 refers to a ring configured to secure the first return spring 605. In some embodiments, the first force-bearing ring 604 is fixedly provided on an outer side of the circular movable shaft 601.

The first return spring 605 refers to a spring configured to reset the arc-shaped connecting plate 602. In some embodiments, the first return spring 605 is sleeved over the circular movable shaft 601, and the first return spring 605 is located on an inner side of the first force-bearing ring 604.

In some embodiments of the present disclosure, by slidingly providing the circular movable shaft 601 on the positioning cage 501, the chamfer is provided at the outer end of the circular movable shaft 601, and the outer end of the circular movable shaft 601 is inserted into the corresponding positioning hole 5021, which positions the limiting snap ring 502. When the circular array of tapered rollers 300 need to be replaced, the staff pulls the arc-shaped connecting plate 602 outwardly through the two rectangular gripping slots 6021, so that the outer end of the circular movable shaft 601 is separated from the positioning hole 5021, which is convenient for the staff to separate the limiting snap ring 502 from the positioning cage 501, and is favorable for the rapid replacement of the circular array of tapered rollers 300.

Figure 10:
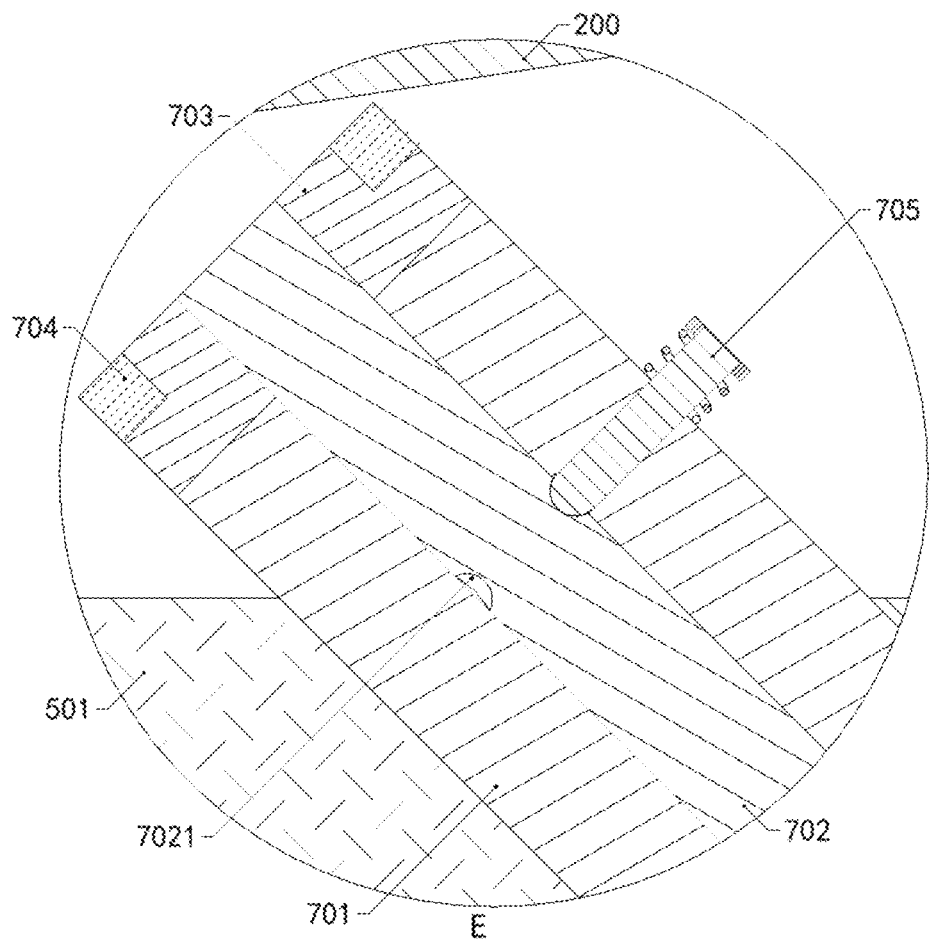
FIG. 10 is a partially enlarged diagram of a structure of region E in FIG. 3.

In addition, because the circular array of first connecting clamping grooves 102 and the circular array of second connecting clamping grooves 201 are of the same size, the two circular inserts 603 are provided with chamfers at the outer ends, and the two circular inserts 603 may be inserted into one of the first connecting clamping grooves 102 and one of the second connecting clamping grooves 201, respectively, when the TSP bearing of the embodiment of the present disclosure needs to be transported after manufacture, the staff pulls the arc-shaped connecting plate 602 outwardly through the two rectangular gripping slots 6021, so that the two circular inserts 603 are separated from the two receiving slots 5011. Then the staff rotates the arc-shaped connecting plate 602 by 90 degrees with the circular movable shaft 601 as the center, and loosens the arc-shaped connecting plate 602 thereafter to ensure that the two circular inserts 603 are inserted in the corresponding first connecting clamping groove 102 and second connecting clamping groove 201, which connects the seat ring 100 and the shaft ring 200. Thus, it is convenient to stack a plurality of TSP bearings for transportation without the need for individual packaging, which is conducive to improving logistical efficiency. FIG. 9 is a schematic diagram illustrating a detection unit according to some embodiments of the present disclosure. FIG. 10 is a partially enlarged diagram of a structure of region E in FIG. 3.

In some embodiments, as shown in FIG. 9 and FIG. 10, the detection unit 700 includes a circular mounting sleeve 701, a circular connecting shaft 702, and two circular mounting seats 703. The circular mounting sleeve 701 is fixedly provided on the positioning cage 501. The circular connecting shaft 702 is rotatably provided inside the circular mounting sleeve 701, and the outer wall of the circular connecting shaft 702 is provided with a circular array of arc-shaped grooves 7021. The two circular mounting seats 703 are fixedly provided at the two ends of the circular connecting shaft 702.

In some embodiments, the detection unit 700 further includes two circular arrays of rectangular metal blocks 704, a circular positioning rod 705, a second force-bearing ring 706, and a return tension spring 707. The two circular arrays of rectangular metal blocks 704 are fixedly provided on the two circular mounting seats 703, and there is a gap between an upper (i.e., the side facing the shaft ring 200) circular array of the rectangular metal blocks 704 in the two circular arrays of rectangular metal blocks 704 and the shaft ring 200, and there is a gap between a lower (i.e., the side facing the seat ring 100) circular array of rectangular metal blocks 704 in the two circular arrays of rectangular metal blocks 704 and the seat ring 100. The circular positioning rod 705 is slidably provided on the circular mounting sleeve 701, an inner end of the circular positioning rod is provided with a fillet, and the circular positioning rod 705 is also inserted in a corresponding arc-shaped groove 7021. The second force-bearing ring 706 is fixedly provided on an outer end of the circular positioning rod 705. The return tension spring 707 is provided on the outer end of the circular positioning rod 705, an outer end of the return tension spring 707 is fixedly connected with the second force-bearing ring 706, and an inner end of the return tension springs 707 is fixedly connected with the circular mounting sleeve 701.

In some embodiments of the present disclosure, due to the gap between the upper circular array of rectangular metal blocks 704 in the two circular arrays of rectangular metal blocks 704 and the shaft ring 200 and the gap between the lower circular array of rectangular metal blocks 704 in the two circular arrays of rectangular metal blocks 704 and the seat ring 100, when the circular array of tapered rollers 300 or the shaft ring 200 is severely worn, the upper circular array of rectangular metal blocks 704 may contact the shaft ring 200 and mark the inner wall of the shaft ring 200. When the circular array of tapered rollers 300 or the seat ring 100 is severely worn, the lower circular array of rectangular metal blocks 704 may contact the seat ring 100 and mark the inner wall of the seat ring 100, which is convenient for the staff to know the wear conditions of the seat ring 100, the shaft ring 200, and the circular array of tapered rollers 300 during maintenance.

In addition, because the circular connecting shaft 702 is rotatably provided inside the circular mounting sleeve 701, two circular mounting seats 703 are fixedly provided at two ends of the circular connecting shaft 702, and the two circular arrays of rectangular metal blocks 704 are fixedly provided on the two circular mounting seats 703, it is convenient for the staff to appropriately adjust the position of the two circular arrays of rectangular metal blocks 704, to ensure that the two circular arrays of rectangular metal blocks 704 may be used for many times after replacement, reducing a count of replacements of the rectangular metal blocks 704, Furthermore, because the outer wall of the circular connecting shaft 702 is provided with a circular array of arc-shaped grooves 7021, the inner end of the circular positioning rod 705 is provided with the chamfer, and the circular positioning rod 705 is also inserted in the corresponding arc-shaped groove 7021, when the staff rotates one of the circular mounting seats 703, the circular connecting shaft 702 pushes the circular positioning rod 705 outwardly, and when the circular connecting shaft 702 is rotated at a suitable angle, the circular positioning rod 705 is automatically reset under the action of the return tension spring 707, so as to make the circular connecting shaft 702 more stable after being rotated.

Figure 11:
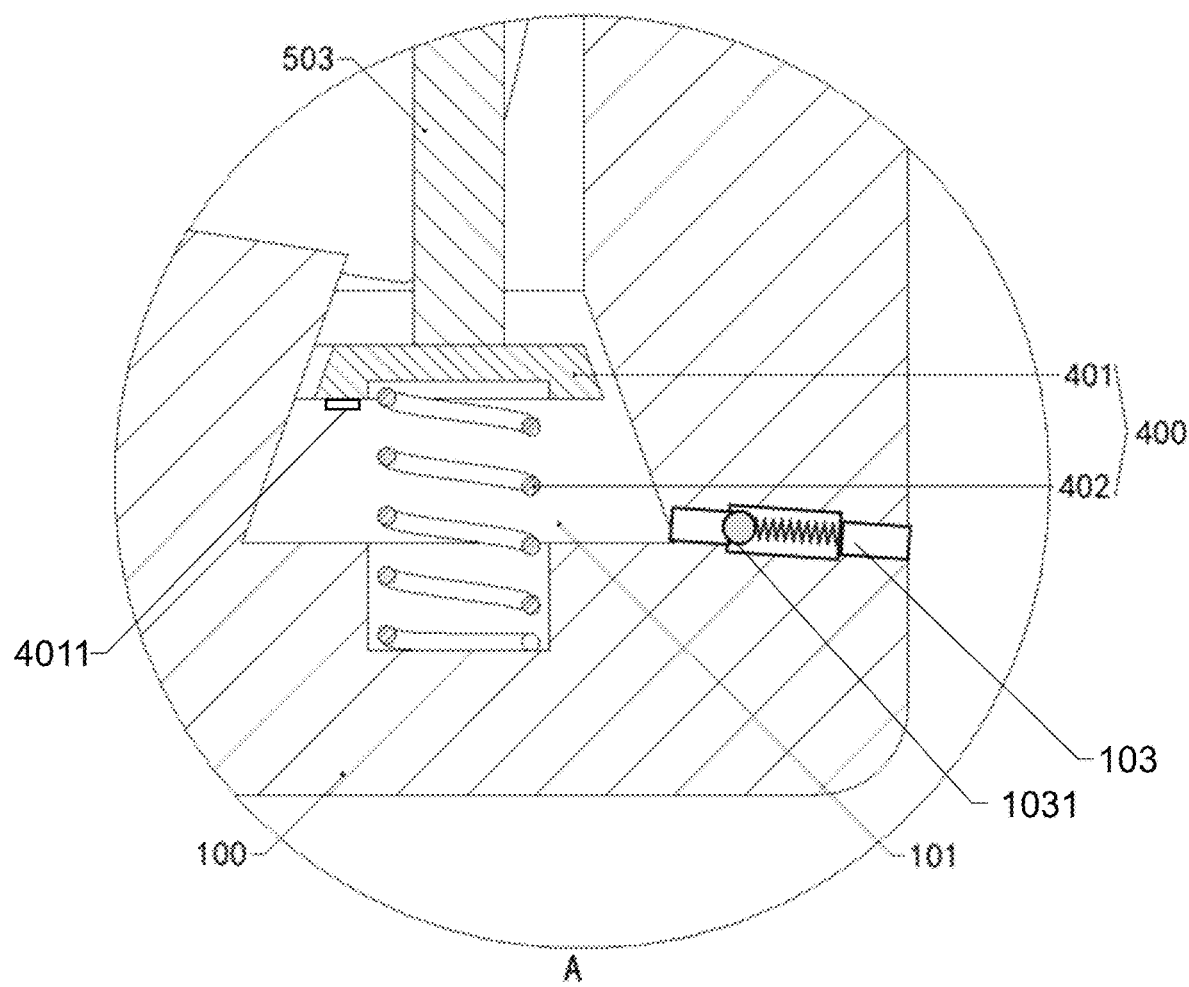
FIG. 11 is a partially enlarged diagram of a structure including an inclined deflector channel in region A of FIG. 3.

FIG. 11 is a partially enlarged diagram of a structure including an inclined deflector channel in region A of FIG. 3. In some embodiments, as shown in FIG. 11, an inclined deflector groove 103 is also provided in the sidewall of the seat ring 100.

The inclined deflector groove 103 refers to a deflector groove that serves as a centrifugal slag discharge channel, utilizing the centrifugal force generated by the rotation of the TSP bearing to fling out impurities. In some embodiments, to ensure a unidirectional flow of the impurities, the inclined deflector groove 103 may be provided with a blocking member 1031, as shown in FIG. 11, and the blocking member 1031 is configured to block outside slurry under high pressure from intruding into the impurity temporary storage groove 101. For example, the blocking member 1031 may be a small ball connected to a spring shown in FIG. 11 or may be a stationary baffle shaped like a Tesla valve, or the like.

Taking the blocking member 1031 as an example of a small ball connected to a spring, at this time, the inclined deflector groove 103 includes two sections of channels with different pore diameters, a pore diameter of the channel on the side of the impurity temporary storage groove 101 is smaller, the small ball and the spring connected to the small ball are located in the channel with the larger pore diameter, and the diameter of the small ball is between the apertures of the two channels. When there is no impurity or less impurity in the impurity temporary storage groove 101, the spring extends so that the small ball may block the channel with the smaller pore diameter in the inclined deflector groove 103, so that the external slurry cannot intrude into the impurity temporary storage groove 101. When the tapered rollers 300 roll, a pressure may be provided, which may promote the gathering of impurities into the impurity temporary storage groove 101. When the impurities are full inside the impurity temporary storage groove 101, the impurities may feedback a pressure to the circular blocking ring 401, which may squeeze the impurities in the inclined deflector groove 103, and then squeeze the small ball so that the spring connected to the small ball is compressed, making the inclined deflector groove 103 connected to the outside, and prompting the impurities to be discharged. When the impurities are discharged to a certain extent, the pressure is restored, the spring is changed back to the state of stretching, so that the small ball re-blocks the inclined deflector groove 103 connecting to the outside world.

Figure 12:
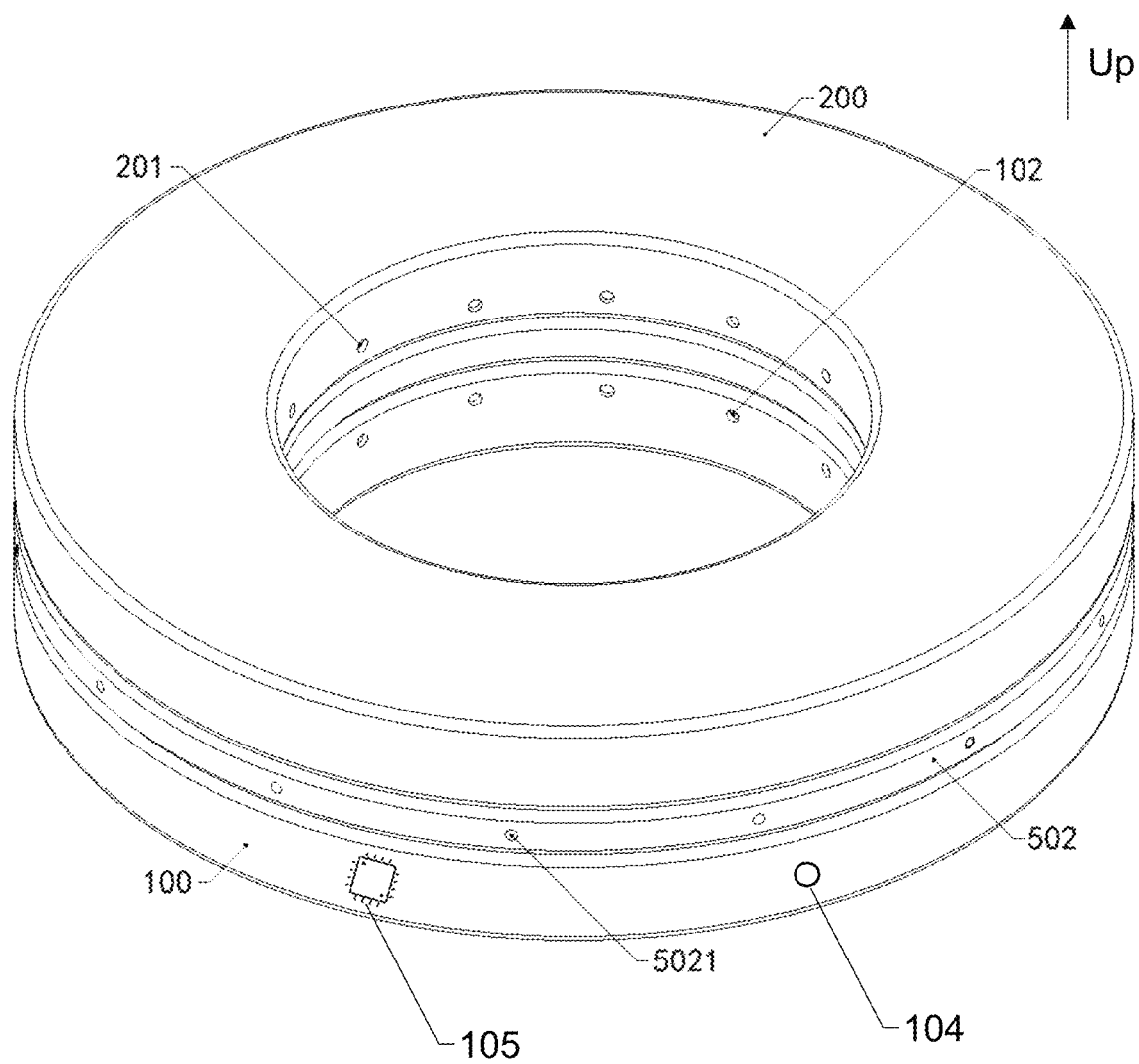
FIG. 12 is a schematic diagram illustrating another three-dimensional structure of a TSP bearing according to some embodiments of the present disclosure.

In some embodiments of the present disclosure, by providing the inclined deflector groove and the blocking member to ensure a unidirectional slag discharge, the impurities in the impurity temporary storage groove may be discharged in a timely and automated manner to avoid the impurities from sludging up to cause more serious wear. FIG. 12 is a schematic diagram illustrating another three-dimensional structure of a TSP bearing according to some embodiments of the present disclosure.

In some embodiments, as shown in FIG. 11, FIG. 12, a piezoelectric sensor 4011 is provided on a bottom surface of the circular blocking ring 401, and a signal receiver 104 is provided on the seat ring 100.

The piezoelectric sensor 4011 refers to a sensor configured to obtain the pressure to which the circular blocking ring 401 is subjected. In some embodiments, the piezoelectric sensor is configured to monitor the pressure applied to the circular blocking ring 401.

The signal receiver 104 refers to a receiver configured to receive a piezoelectric signal output from the piezoelectric sensor 4011. In some embodiments, if a signal indicator light is provided on the upper portion of a drill pipe, the signal receiver 104 may also be configured to control the signal indicator light on the upper portion of the drill pipe to flash in different colors based on the piezoelectric signal. Different piezoelectric signals correspond to different pressure values, and different colors of the signal indicator light correspond to different pressure value intervals. The drill pipe refers to a pipe used to feed the drill bit into the ground for drilling. The rotary steerable tool is connected to the lower portion of the drill pipe and may control the rotation of the drill pipe for directional drilling. The upper portion of the drill pipe is located on the ground, and the signal indicator light is provided on the upper portion of the drill pipe to help the staff to observe at any time.

In some embodiments, as shown in FIG. 12, the TSP bearing further includes a control assembly 105, and the control assembly 105 refers to an assembly for controlling the operating state of the TSP bearing. In some embodiments, the control assembly 105 may include an embedded system, e.g., the control assembly 105 may include a programmable logic controller (PLC) or a microcontroller unit (MCU), as well as the necessary communication interface (e.g., an Ethernet module). In some embodiments, as shown in FIG. 12, the control assembly 105 may be provided on the seat ring 100.

In some embodiments, the control assembly 105 may be divided into numerical intervals of pressure values corresponding to the piezoelectric signals according to historical drilling data or historical experimental data, with each interval corresponding to a color.

For example, the control assembly 105 may acquire a plurality of pieces of historical drilling data or historical experimental data, and according to wear rates of the seat ring 100 and the shaft ring 200 in the plurality of pieces of historical drilling data or the historical experimental data when the signal receiver receives different piezoelectric signals, determine the minimum pressure value corresponding to the wear rate greater than a preset rate threshold as the boundary value between the interval 1 and the interval 2. The control assembly 105 may designate the average of the pressure values when the wear rate is equal to 80% of the preset rate threshold as the boundary value between the interval 2 and the interval 3, and map the interval 1, the interval 2, and the interval 3 to three different colors of the signal indicator light. The signal receiver may regulate the signal indicator light to flash according to the corresponding color of the pressure value interval corresponding to the piezoelectric signal. The preset rate threshold may be preset by a technician.

As another example, the control assembly 105 may acquire a plurality of pieces of historical drilling data or historical experimental data, according to an impurity content within the impurity temporary storage groove 101 in the plurality of pieces of the historical drilling data or historical experimental data when different piezoelectric signals are received by the signal receiver, divide the interval 1, the interval 2, and the interval 3 based on a preset impurity content threshold utilizing a manner similar to the above example. The preset impurity content threshold may be pre-determined by a technician.

As yet another example, the control assembly 105 may acquire a plurality of pieces of historical drilling data or historical experimental data, designate the lowest pressure value corresponding to the piezoelectric signal in the plurality of pieces of the historical drilling data or historical experimental data when a drilling failure due to wear of the TSP bearing occurs, as the boundary value between the interval 1 and the interval 2, and map the interval 1 and the interval 2 to two different colors of the signal indicator light. The signal receiver may regulate the signal indicator light to flash according to the corresponding color of the pressure value interval corresponding to the piezoelectric signal.

The historical drilling data refers to relevant data acquired during a historical drilling operation, which may include, for example, the impurity content in the impurity temporary storage groove 101 acquired during the historical drilling operation, the corresponding pressure values and the wear rates of the TSP bearing, etc. The historical experimental data refers to relevant data acquired during a historical experimental operation, which includes data similar to the historical drilling data. The impurity content in the impurity temporary storage groove 101 may be measured and obtained using an external device after suspending the drilling operation. The wear rate may be measured or determined by a measuring instrument (not shown in the FIGs) provided on the TSP bearing, as described in the relevant descriptions hereinafter.

In some embodiments of the present disclosure, the piezoelectric signal, the signal receiver, and the signal indicator light are set to enable the well personnel to intuitively know the condition of the buildup of impurities inside the bearing, so that the operation time can be adjusted and the maintenance can be arranged in time.

Some embodiments of the present disclosure further provide a method for manufacturing the TSP bearing for the rotary steerable tool, including the following operations.

First, a circular array of tapered rollers 300 are inserted into the positioning cage 501, the arc-shaped connecting plate 602 is pulled outward, the limiting snap ring 502 is slidingly provided on the outer side of the positioning cage 501, and then the arc-shaped connecting plate 602 is released to allow the outer end of the circular movable shaft 601 to be inserted into the corresponding positioning hole 5021.

Second, the circular array of tapered rollers 300 is placed on top of the seat ring 100, ensuring that the bottom of the circular array of circular pressing rods 503 is in contact with the circular blocking ring 401.

Third, the shaft ring 200 is placed on top of the circular array of tapered rollers 300.

Fourth, the arc-shaped connecting plate 602 is pulled outward to separate the two circular inserts 603 from the two receiving slots 5011, and then the arc-shaped connecting plate 602 is rotated by 90 degrees, subsequently, the arc-shaped connecting plate 602 is released to ensure that the two circular inserts 603 are inserted into one of the first connecting clamping grooves 102 and one of the second connecting clamping grooves 201, respectively.

Exemplarily, this embodiment is used in the following specific operations and functions.

The circular array of tapered rollers 300 are inserted into the positioning cage 501, then the arc-shaped connecting plate 602 is pulled outward, after which the limiting snap ring 502 is slidingly provided on the outer side of the positioning cage 501, and the arc-shaped connecting plate 602 is released to allow the outer end of the circular movable shaft 601 to be inserted into the corresponding positioning hole 5021. The circular array of tapered rollers 300 is placed on top of the seat ring 100 to ensure that the bottom of the circular array of circular pressing rods 503 is in contact with the circular blocking ring 401. The shaft ring 200 is placed on top of the circular array of tapered rollers 300. The arc-shaped connecting plate 602 is pulled outward to separate the two circular inserts 603 from the two receiving slots 5011, then the arc-shaped connecting plate 602 is rotated by 90 degrees with the circular movable shaft 601 as the center, subsequently, the arc-shaped connecting plate 602 is released to ensure that the two circular inserts 603 are inserted into the corresponding first connecting clamping groove 102 and the corresponding second connecting clamping groove 201. Therefore, the seat ring 100 and the shaft ring 200 are connected, which facilitates stacking a plurality of TSP bearings for transportation without the need for individual packaging, which contributes to the improvement of logistical efficiency. By providing the impurity temporary storage groove 101, impurities and wear debris are temporarily stored in parts that enter during operation, which avoids the debris and wear debris from affecting the subsequent service life. When the staff remove the positioning unit 500, the circular blocking ring 401 automatically moves upwards under the effect of the second return springs 402, so that the circular blocking ring 401 is automatically in contact with the seat ring 100. When the staff wipes the inside of the seat ring 100 in the maintenance process, the circular blocking ring 401 seals the impurity temporary storage groove 101, avoiding bringing out the impurities in the impurity temporary storage groove 101 during the wiping process, and facilitating wiping of the inside of the seat ring 100. The detection unit 700 is pre-installed by the technician on the seat ring 100 and calibrated during installation. When the circular array of tapered rollers 300 or the shaft ring 200 is worn severely, the upper circular array of rectangular metal blocks 704 may contact the shaft ring 200 and mark the inner wall of the shaft ring 200. When the circular array of tapered rollers 300 or the seat ring 100 is worn severely, the lower circular of rectangular metal blocks 704 may contact the seat ring 100, and mark the inner wall of the seat ring 100, which is convenient for the staff to know the wear conditions of the seat ring 100, the shaft ring 200, and the circular array of tapered rollers 300 during maintenance. By setting two circular arrays of rectangular metal blocks 704 and the circular mounting seat 703, it is convenient for the staff to appropriately adjust the position of the two circular arrays of rectangular metal blocks 704 to ensure that the two circular arrays of rectangular metal blocks 704 may be used for many times after replacement, reducing the count of replacements of the rectangular metal blocks 704. When the staff rotates one of the circular mounting seat 703, the circular connecting shaft 702 the circular positioning rod 705 is pushed outward, and when the circular connecting shaft 702 rotates at a suitable angle, the circular positioning rod 705 is automatically reset under the action of the return tension spring 707, so as to make the circular connecting shaft 702 more stable after rotation. When the circular array of tapered rollers 300 need to be replaced, the staff pulls the arc-shaped connecting plate 602 outward through the two rectangular gripping slots 6021, so that the outer end of the circular movable shaft 601 and the positioning hole 5021 are separated, which is convenient for the staff to separate the limiting snap ring 502 and the positioning cage 501, and is favorable for the rapid replacement of the circular array of tapered rollers 300. When the two circular arrays of rectangular metal blocks 704 need to be replaced, the staff removes two circular arrays of used rectangular metal blocks 704 using pliers, and after that connects two circular arrays of new rectangular metal blocks 704 with the two circular mounting seats 703 using glue. When the seat ring 100 is finished wiping and the staff resets the positioning unit 500, the circular array of circular pressing rods 503 drives the circular blocking ring 401 to move downward automatically.

In some embodiments, the method for manufacturing the TSP bearings further includes laser melting three layers of tracer coatings of different colors on the surfaces of the seat ring 100 and the shaft ring 200, respectively.

The tracer coating refers to a functional coating applied to a critical wear surface of a bearing. In some embodiments, the control assembly 105 may utilize laser melting equipment to melt metal powder as a raw material through a laser melting process and designate the solidified metal powder as a tracer coating to form a strong metallurgical bond with the bearing substrate. During subsequent maintenance of the equipment, the control assembly 105 may determine wear degrees of the seat ring 100 and the shaft ring 200 of the TSP bearing by controlling the coating identification device to identify the color that is revealed on the surface of the seat ring 100 and the shaft ring 200 of the TSP bearing. For example, three layers of coating may be set up, with different colors from the inside to the outside, the innermost layer being red, the middle layer being yellow, and the outermost layer being green. The outer layer exposes the color of the inner layer when it wears out, and different colors correspond to different wear degrees. The wear degree is used to characterize the degree of degradation due to the wear of the seat ring 100 or the shaft ring 200, for example, the wear degree may include slight wear, significant wear, and severe wear, corresponding to three tracer coatings with three different colors.

In some embodiments, the wear degree may also be a normalized value between 0 and 1. For example, the normalized value may be determined in conjunction with the measuring instrument measuring a wear depth. Exemplarily, a wear degree in a range of 0-0.3 may indicate slight wear, corresponding to a green color of the tracer coating, indicating that only routine maintenance is required; a wear degree in the range of 0.3-0.7 may indicate significant wear, corresponding to a yellow color of the tracer coating, indicating that a schedule of comprehensive overhaul is required; a wear degree greater than 0.7 indicates serious wear, corresponding to the tracer coating is red, indicating that an immediate replacement is required.

In some embodiments, the control assembly 105 may analyze the historical drilling data to identify key events corresponding to different wear degrees due to bearing wear, such as "operation abnormality (requiring maintenance)", "suspension of operation (requiring overhaul)", and "failure (requiring replacement)", etc. The control assembly 105 may measure and determine an average wear depth corresponding to each key event by the measuring instrument, and determine, based on the average wear depth corresponding to each key event, the design thicknesses of each color layer in the plurality of layers of tracer coatings, to make the color changes in the tracer coatings corresponding to the specific maintenance requirements.

In some embodiments of the present disclosure, by fabricating the tracer coating with colors and thickness on the surface of the TSP bearing, it is possible to intuitively understand the wear degree of the TSP bearing, which in turn clearly determines the need for replacing the TSP bearings or for temporary servicing, which improves the drilling efficiency.

In some embodiments, the control assembly 105 is communicatively connected with a controller of the rotary steerable tool. The control assembly 105 is configured to predict, based on the piezoelectric signal, a pre-operational feature, and drilling geologic information, a predicted wear degree of the TSP bearing through a wear model, generate an adjusted rotational speed based on the predicted wear degree, and send the adjusted rotational speed to the controller. The controller controls the rotary steerable tool to rotate at different rotational speeds based on the adjusted rotational speed.

The controller refers to a component that processes data related to the operation of the rotary steerable tool and generates instructions. For example, the controller may be a central processing unit (CPU), a graphics processing unit (GPU), an application specific integrated circuit (ASIC), etc., or any combination thereof. In some embodiments, the controller may be provided on the rotary steerable tool or on the upper portion of the drill pipe to control the rotary steerable tool via wireless communication.

The wear model refers to a model used to determine the wear degree of the TSP bearing. In some embodiments, the wear model may be a machine learning model, e.g., a neural network (NN) model, a deep neural network (DNN) model, etc.

An input of the wear model may include the piezoelectric signal, the pre-operational feature, and the drilling geologic information. More descriptions regarding the piezoelectric signal may be found in related descriptions hereinabove. The pre-operational feature refers to a feature before commencing a drilling operation, for example, the pre-operational feature may include the initial wear degree of the TSP bearing before commencing the drilling operation (e.g., the wear depth measured by the measuring instrument). The drilling geologic information refers to geologic information during the drilling operation, which may include, for example, a subsurface temperature, a rock type, or a soil type during the drilling operation. In some embodiments, the pre-operational feature and the drilling geologic information may be obtained by staff input via an external device (e.g., an input screen, a button, etc.) connected to the control assembly 105.

In some embodiments, an output of the wear model includes the predicted wear degree corresponding to the TSP bearing. For example, the output of the wear model may be a normalized value between 0 and 1, representing the predicted wear degree, see the previous related description of the wear degree.

In some embodiments, the wear model may be trained with a plurality of training samples with training labels. The training samples include a sample piezoelectric signal, a sample pre-operational feature, and sample drilling geologic information from the historical drilling data. The training labels may be constructed based on an average of actual wear degrees corresponding to the training samples in the historical drilling data. For example, the training labels may be determined based on an average of actual wear depths of the tracer coatings corresponding to the training samples in the historical drilling data. It will be appreciated that in the historical drilling data, the training samples may correspond to a plurality of actual wear degrees.

In some embodiments, the control assembly 105 may be trained to obtain the wear model based on a training dataset, the training dataset including a plurality of training samples and corresponding training labels. For example, the control assembly 105 may obtain the training dataset based on the historical drilling data and perform a plurality of rounds of iterations. At least one round of iterations includes selecting one or more samples from the training dataset, inputting one or more training samples into an initial wear model, obtaining predicted outputs corresponding to the one or more training samples, calculating a value of a loss function by substituting the predicted outputs and the training labels corresponding to the one or more training samples into a formula of a predefined loss function, and inversely updating a model parameter in the initial wear model based on the value of the loss function, which may be performed in a variety of ways. For example, the updating of the model parameter may be performed based on a gradient descent algorithm. When an end-of-iteration condition (e.g., the loss function converges, or a count of iterations reaches the threshold) is satisfied, the iteration is ended, and the trained wear model is obtained.

In some embodiments, the control assembly 105 may generate the adjusted rotational speed based on the predicted wear degree in a variety of ways. The adjusted rotational speed refers to the desired rotational speed of the rotary steerable tool after adjusting the rotary steerable tool based on the predicted wear degree.

In some embodiments, the control assembly 105 may first determine a current wear rate, which may be obtained by dividing a difference between the current predicted wear degree and the last predicted wear degree by the time interval between two predictions, or by dividing a difference between the pre-operational feature and the currently predicted wear degree by a duration of the operation.

In some embodiments, after determining the current wear rate, the control assembly 105 may generate the adjusted rotational speed based on the currently predicted wear degree and the current wear rate according to a preset rule. In some embodiments, the preset rule may be that the adjusted rotational speed is positively correlated to the current rotational speed, positively correlated to the preset rate, and inversely correlated to the wear rate. The preset rate is a baseline value of the desired wear rate based on statistics of historical drilling data. Exemplarily, the adjusted rotational speed may be calculated by the following equation (1):

$$v1 = v2 \times (1-a) \times v3/v4 \qquad (1)$$

v1 denotes the adjusted rotational speed, v2 denotes the current rotational speed, v3 denotes the preset rate, v4 denotes the wear rate, and a denotes the predicted wear degree.

In some embodiments, an adjusted rotational speed is generated, the control assembly 105 may send the adjusted rotational speed to the controller, and the controller controls the rotary steerable tool to rotate at the adjusted rotational speed based on the adjusted rotational speed. When the adjusted rotational speed is 0, the controller may control the rotary steerable tool to stop operation.

In some embodiments of the present disclosure, by predicting the predicted wear degree of the TSP bearing based on a plurality of types of information and dynamically adjusting the rotational speed accordingly, the wear rate of the TSP bearing is reduced, so as to provide a cushion time for the subsequent stopping of the operation or overhauling. Thus, the efficiency of fault troubleshooting is significantly improved, and, at the same time, the TSP bearing with a larger wear degree may be timely replaced to avoid further serious drilling failures.

In the present disclosure, there the following points require attention.

Firstly, the accompanying drawings of the embodiments of the present disclosure relate only to the structures involved with the embodiments of the present disclosure, and other structures may be referred to the usual design.

Secondly, without conflict, the embodiments and features in the embodiments of the present disclosure can be combined to obtain new embodiments.

The above is only a specific implementation of the present disclosure, but the scope of protection of the present disclosure is not limited thereto. Any person skilled in the art who is familiar with the field of technology within the scope of the technology exposed in the present disclosure can easily think of variations or substitutions, which shall be covered in the scope of protection of the present disclosure. Thus, the scope of protection of the present disclosure shall be governed by the scope of protection of the claims.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment", "one embodiment", or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

What is claimed is:

1. A thermally stable polycrystalline diamond (TSP) bearing for a rotary steerable tool, comprising a seat ring, a shaft ring, a blocking unit, a positioning unit, a multifunctional unit, and a detection unit, wherein the shaft ring is provided directly above the seat ring, and a circular array of tapered rollers is provided between the seat ring and the shaft ring; the blocking unit is provided inside the seat ring and the blocking unit is configured to seal collected impurities; the positioning unit is provided outside the circular array of tapered rollers, and the positioning unit is configured to position the circular array of tapered rollers;

the multifunctional unit is provided on the positioning unit for limiting the positioning unit, the multifunctional unit is also configured to connect the seat ring with the shaft ring; the detection unit is provided on the positioning unit, the detection unit is configured to detect wear conditions of the seat ring, the shaft ring, and the circular array of tapered rollers;

an inner wall of the seat ring is provided with a circular array of first connecting clamping grooves; an inner wall of the shaft ring is provided with a circular array of second connecting clamping grooves, and a size of the circular array of first connecting clamping grooves is the same as a size of the circular array of second connecting clamping grooves;

the positioning unit includes a positioning cage and a limiting snap ring; the positioning cage is provided with two receiving slots; the limiting snap ring is provided with a circular array of positioning holes; and the multifunctional unit includes a circular movable shaft, an arc-shaped connecting plate, two circular inserts, a first force-bearing ring, and a first return spring; the circular movable shaft is slidably provided on the positioning cage, with an outer end of the circular movable shaft inserted into a corresponding positioning hole; the arc-shaped connecting plate is fixedly provided on an inner end of the circular movable shaft; the two circular inserts are fixedly provided on an outer side of the arc-shaped connecting plate; the two circular inserts are received in the two receiving slots and inserted into one of the first connecting clamping grooves and one of the second connecting clamping grooves, respectively; the first force-bearing ring is fixedly provided on an outer side of the circular movable shaft; and the first return spring is sleeved over the circular movable shaft and the first return spring is located on an inner side of the first force-bearing ring.

2. The TSP bearing according to claim 1, wherein the seat ring is provided with an impurity temporary storage groove.

3. The TSP bearing according to claim 2, wherein the blocking unit includes a circular blocking ring and a circular array of second return springs; the circular blocking ring is provided in the impurity temporary storage groove, with a gap existing between the circular blocking ring and the seat ring; and the circular array of the second return springs is fixedly provided at a bottom of the circular blocking ring.

4. The TSP bearing according to claim 3, wherein the positioning unit further includes a circular array of circular pressing rods; the positioning cage is rotationally connected to the circular array of tapered rollers; the limiting snap ring is slidably provided on an outer side of the positioning cage; and the circular array of circular pressing rods is fixedly provided on a bottom of the positioning cage, and a bottom of the circular array of circular pressing rods is in contact with the circular blocking ring.

5. The TSP bearing according to claim 4, wherein the detection unit includes a circular mounting sleeve, a circular connecting shaft, and two circular mounting seats; the circular mounting sleeve is fixedly provided on the positioning cage; the circular connecting shaft is rotatably provided inside the circular mounting sleeve, and an outer wall of the circular connecting shaft is provided with a circular array of arc-shaped grooves; and the two circular mounting seats are fixedly provided at two ends of the circular connecting shaft.

6. The TSP bearing according to claim 5, wherein the detection unit further includes two circular arrays of rectangular metal blocks, a circular positioning rod, a second force-bearing ring, and a return tension spring; the two circular arrays of rectangular metal blocks are fixedly provided on the two circular mounting seats; a gap between an upper circular array of rectangular metal blocks in the two circular arrays of rectangular metal blocks and the shaft ring, and a gap between a lower circular array of rectangular metal blocks in the two circular arrays of rectangular metal blocks and the seat ring; the circular positioning rod is slidably provided on the circular mounting sleeve, with an inner end of the circular positioning rod provided with a fillet, and the circular positioning rod is inserted into a corresponding arc-shaped groove; the second force-bearing ring is fixedly provided on an outer end of the circular positioning rod; and the return tension spring is sleeved over the circular positioning rod, with an outer end of the return tension spring fixedly connected with the second force-bearing ring and an inner end of the return tension spring fixedly connected with the circular mounting sleeve.

7. A method for manufacturing a TSP bearing for a rotary steerable tool, applicable to the TSP bearing according to claim 4, the method comprising:

inserting the circular array of tapered rollers into the positioning cage, pulling the arc-shaped connecting plate outward, slidingly providing the limiting snap ring on the outer side of the positioning cage, and then releasing the arc-shaped connecting plate to allow the outer end of the circular movable shaft to be inserted into the corresponding positioning hole;

placing the circular array of tapered rollers on top of the seat ring, ensuring that the bottom of the circular array of circular pressing rods is in contact with the circular blocking ring;

placing the shaft ring on top of the circular array of tapered rollers; and pulling the arc-shaped connecting plate outward to separate the two circular inserts from the two receiving slots, then rotating the arc-shaped connecting plate by 90 degrees, subsequently releasing the arc-shaped connecting plate to ensure that the two circular inserts are inserted into one of the first connecting clamping grooves and one of the second connecting clamping grooves, respectively.

8. The TSP bearing according to claim 1, wherein the outer end of the circular movable shaft is provided with a chamfer; two rectangular gripping slots are provided on the arc-shaped connecting plate, and the outer side of the arc-shaped connecting plate is in contact with the positioning cage.

9. The TSP bearing according to claim 1, wherein outer ends of the two circular inserts are provided with chamfers.

* * * * *